United States Patent
Horiuchi et al.

(10) Patent No.: US 12,473,488 B2
(45) Date of Patent: Nov. 18, 2025

(54) AQUEOUS LIQUID COMPOSITION AND AQUEOUS INK

(71) Applicant: CANON KABUSHIKI KAISHA, Tokyo (JP)

(72) Inventors: Takayuki Horiuchi, Kawasaki (JP); Naofumi Shimomura, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 1102 days.

(21) Appl. No.: 17/021,800

(22) Filed: Sep. 15, 2020

(65) Prior Publication Data

US 2020/0407629 A1  Dec. 31, 2020

Related U.S. Application Data

(63) Continuation of application No. PCT/JP2019/013579, filed on Mar. 28, 2019.

(30) Foreign Application Priority Data

Mar. 30, 2018 (JP) .................................. 2018-068247

(51) Int. Cl.
| | | |
|---|---|---|
| C09K 11/06 | (2006.01) | |
| C08L 101/02 | (2006.01) | |
| C08L 101/08 | (2006.01) | |
| C09D 11/50 | (2014.01) | |

(52) U.S. Cl.
CPC .......... C09K 11/06 (2013.01); C08L 101/025 (2013.01); C08L 101/08 (2013.01); C09D 11/50 (2013.01); C08L 2201/54 (2013.01); C09K 2211/1433 (2013.01); C09K 2211/182 (2013.01)

(58) Field of Classification Search
CPC ............ C09K 11/06; C09K 2211/1433; C09K 2211/182; C08L 101/025; C08L 101/08; C08L 2201/54; C09D 11/50
See application file for complete search history.

(56) References Cited

U.S. PATENT DOCUMENTS

| | | | | |
|---|---|---|---|---|
| 5,294,664 A | * | 3/1994 | Morrison, Jr. ....... | C09K 11/025 524/565 |
| 2003/0189190 A1 | * | 10/2003 | Miyano ................. | C09K 11/06 252/301.16 |
| 2010/0086701 A1 | * | 4/2010 | Iftime .................. | C09D 11/101 524/556 |
| 2013/0299423 A1 | | 11/2013 | Wang | |

FOREIGN PATENT DOCUMENTS

| | | |
|---|---|---|
| EP | 1 264 872 A1 | 12/2002 |
| JP | 06-509599 A | 10/1994 |
| JP | 2000-107505 A | 4/2000 |
| JP | 2000-345052 A | 12/2000 |
| JP | 2001-254075 A | 9/2001 |
| JP | 2002-179965 A | 6/2002 |
| JP | 2004-203924 A | 7/2004 |
| JP | 2005-036117 A | 2/2005 |
| JP | 2007-526361 A | 9/2007 |
| JP | 2009-179780 A | 8/2009 |
| JP | 2014-019670 A | 2/2014 |
| WO | 2004/056894 A1 | 7/2004 |

OTHER PUBLICATIONS

Takayuki Horiuchi et al.; "Di- and tetracarboxylate ligands for highly luminescent terbium(III) complexes on the basis of sulfonylcalix[4]arene scaffold;" Tetrahedron Letters , 48(5), 2007, pp. 821-825.
R.S. Viana, et al.; "Structural and spectroscopic investigation of new luminescent hybrid materials based on calix[ 4] arene-tetracarboxylate and Ln3+ ions (Ln=Gd,Tb or Eu);" Journal of Solid State Chemistry 251, 2017, pp. 26-32.
Takashi Kajiwara et al.; "Conformation-Controlled Luminescent Properties of Lanthanide Clusters Containing p-tert-Butylsulfonylcalix[4]arene;" Inorganic Chemistry Communication, 2006, 45(13), pp. 4880-4882.
Takashi Kajiwara et al.; "Octalanthanide Wheels Supported by p-tert-Butylsulfonylcalix[4]arene**;" Angewandte Chemie International Edition 43, 2004, pp. 1832-1835.
Yanfeng Bi et al.; "Thiacalix[4]arene-Supported Planar Ln4 (Ln= TbIII, DyIII) Clusters: Toward Luminescent and Magnetic Bifunctional Materials;" Inorganic Chemistry Article, 48(24), 2009, pp. 11743-11747.
Takashi Kajiwara et al.; "Highly Luminescent Superparamagnetic Diterbium(III) Complex Based on the Bifunctionality of p-tert-Butylsulfonylcalix[4]arene;" European Journal of Inorganic Chemistry, 2008, pp. 5565-5568.
Nariaki Sato, et al.; "Energy-Transfer Luminescence of Lanthanide Ions Complexed with Water-Soluble Calix[n] arenes;" Chemistry Letters 22(7), 1993, pp. 1261-1264.

* cited by examiner

*Primary Examiner* — Jane L Stanley
(74) *Attorney, Agent, or Firm* — Canon U.S.A., Inc. IP Division

(57) ABSTRACT

A liquid composition that is an aqueous liquid composition that emits light when irradiated with ultraviolet light contains a resin particle, the resin particle containing a unit that has a polar group and containing a complex composed of a sulfur-bridged calixarene and a lanthanoid ion, the polar group being at least one selected from the group consisting of an ester group, a carboxy group, a hydroxy group, an ether group, an amino group, an amide group and a cyano group.

17 Claims, No Drawings

AQUEOUS LIQUID COMPOSITION AND AQUEOUS INK

CROSS-REFERENCE TO RELATED APPLICATIONS

This application is a Continuation of International Patent Application No. PCT/JP2019/013579, filed Mar. 28, 2019, which claims the benefit of Japanese Patent Application No. 2018-068247, filed Mar. 30, 2018, both of which are hereby incorporated by reference herein in their entirety.

TECHNICAL FIELD

The present invention relates to an aqueous liquid composition and an aqueous ink that emit light when irradiated with ultraviolet light.

BACKGROUND ART

Up to now, liquid compositions, such as invisible inks, that cannot be visually recognized under a normal environment but can be visually recognized under a specific environment are known. Such liquid compositions (and articles produced using it) are used in various fields by taking advantage of the fact that these are colorless under visible light, but visually recognized by irradiation with, for example, ultraviolet light. For example, in fields where security is required, such as securities and various certificates, they are used to inhibit tampering and counterfeiting. These are also used in fields, such as physical distribution and process management, where it is sufficient for persons in charge to understand the information. Additionally, these are used for printing wallpaper and so forth that shine when exposed to black light. Besides the printing field, these are also used as analysis and detection reagents, for example, for the detection of specific components.

As such a liquid composition, an ink containing resin particles encapsulating a complex composed of a β-diketone compound and a lanthanoid ion is reported (see Patent Literature 1 and 2). As such a complex, a complex composed of a sulfur-bridged calixarene and a lanthanoid ion is known (see Patent Literature 3).

CITATION LIST

Patent Literature

PTL 1 Japanese Patent Laid-Open No. 2002-179965
PTL 2 Japanese Patent Laid-Open No. 2004-203924
PTL 3 Japanese Patent Laid-Open No. 2001-254075

The inventors have conducted studies on a liquid composition containing resin particles dyed with a prepared complex composed of a β-diketone compound and a lanthanoid ion and have found that although sufficient luminescence intensity can be obtained immediately after the liquid composition is prepared, when the liquid composition is stored for a certain period of time, the luminescence intensity is lower than that of the freshly prepared liquid composition.

Accordingly, it is an object of the present invention to provide an aqueous liquid composition in which a decrease in luminescence intensity is suppressed even after the liquid composition is stored. It is another object of the present invention to provide an aqueous ink that can record an image in which a decrease in luminescence intensity is suppressed even after the ink is stored.

SUMMARY OF INVENTION

The object is achieved by the present invention described below. According to the present invention, a liquid composition that is an aqueous liquid composition that emits light when irradiated with ultraviolet light contains a resin particle, the resin particle containing a unit that has a polar group and containing a complex composed of a sulfur-bridged calixarene and a lanthanoid ion, the polar group being at least one selected from the group consisting of an ester group, a carboxy group, a hydroxy group, an ether group, an amino group, an amide group and a cyano group.

Further features of the present invention will become apparent from the following description of exemplary embodiments.

DESCRIPTION OF EMBODIMENTS

The present invention will be described in more detail below with reference to preferred embodiments. In the present invention, hereinafter, an aqueous liquid composition and an aqueous ink may be referred to simply as a "liquid composition" and an "ink". In the present invention, the term "unit" used for a resin refers to a repeating unit originating from one monomer. The values of the physical properties are values at normal temperature (25° C.) unless otherwise specified.

Light emission by irradiation with ultraviolet light is a phenomenon in which energy is emitted as light when a substance absorbs ultraviolet light and an electron in the substance transitions from the ground state to an excited state and then returns to the ground state again. A substance having a high light absorption efficiency (molar extinction coefficient) and high efficiency of converting absorbed light into light to be emitted (luminescence quantum yield) has excellent luminescence intensity. When a complex composed of a ligand and a lanthanoid ion is irradiated with ultraviolet light, the energy received by the ligand is transferred to the lanthanoid ion to lead to strong light emission. Such a complex exhibits good emission intensity.

The inventors prepared and studied a liquid composition containing a complex composed of a β-diketone compound and a lanthanoid ion as described in Patent Literature 1 and 2 and found that the luminescence intensity was decreased after the liquid composition was stored. The decrease in luminescence intensity due to storage occurred even in an environment that was not affected by external light. The inventors speculate that the reason for this is as described below.

The complex composed of a β-diketone compound and a lanthanoid ion is unstable in the state of presence in an aqueous medium. The β-diketone compound is easily detached from the lanthanoid ion. When the β-diketone compound is detached, the energy of ultraviolet light with which the complex is irradiated is not transferred to the lanthanoid ion. Thus, light emission does not occur easily. For this reason, the luminescence intensity was seemingly decreased when the liquid composition was stored.

The inventors have examined the use of a "sulfur-bridged calixarene", which is a ligand that is not easily detached from the lanthanoid ion and have found that in this case, a decrease in luminescence intensity can be suppressed even after the liquid composition is stored.

A typical calixarene is a cyclic molecule having a structure in which multiple phenols are crosslinked between the ortho-positions and is also called a calix[n]arene, where n represents the number of units originating from phenol and is an integer of 3 or more. Hereinafter, the unit originating from phenol is referred to as a "phenolic unit". As the calixarene, a compound in which n is 4, 6 or 8 is generally used. From the viewpoint of a cross-linking group, calixarenes cross-linked with methylene groups (methylene-bridged calixarenes) and calixarenes cross-linked with sulfur atoms or sulfur-containing atomic groups (sulfur-bridged calixarenes) are known.

A sulfur-bridged calixarene used in the present invention contains lone-pair electrons in each cross-linking group (e.g., —S—, —SO— or —$SO_2$—) that can coordinate with a lanthanoid ion. Sulfur atoms and so forth contained in the cross-linking group are highly electron-withdrawing. Thus, the phenolic unit has high acidity, so that the hydroxy group (—OH) in the phenolic unit easily releases a proton to give a phenolate anion (—O—). The resulting phenolate anion can coordinate with the lanthanoid ion. As described above, the sulfur-bridged calixarene has many sites that can coordinate with the lanthanoid ion, thus is not easily detached from the lanthanoid ion and has high stability as a complex. This enables the complex to be present stably in an aqueous medium of the liquid composition. Thus, a decrease in luminescence intensity can be seemingly suppressed even after storage.

In the case of a methylene-bridged calixarene, the cross-linking groups do not contain lone-pair electrons and are electron-donating. Thus, as compared with the foregoing sulfur-bridged type, the methylene-bridged calixarene is less likely to be stably coordinated with the lanthanoid ion and the resulting complex also has low stability. For this reason, the luminescence intensity was seemingly decreased after the liquid composition was stored.

As described above, the complex composed of the sulfur-bridged calixarene and the lanthanoid ion has high stability and thus enables the suppression of a decrease in luminescence intensity even after the liquid composition is stored. The inventors prepared resin particles encapsulating the complex described above with reference to Patent literature 1 and 2 and conducted studies on an aqueous liquid composition containing the resin particles. The results revealed that in the case where the resin particles encapsulating the complex were used for the preparation of the aqueous liquid composition, the luminescence intensity was sometimes decreased after the liquid composition was stored.

The complex composed of the ligand and the lanthanoid ion has high polarity as a whole because the bonds therebetween are easily polarized. In the case where a low-polarity resin, such as a polyolefin resin or a polystyrene resin, is used as a resin for the preparation of the resin particles, the high-polarity complex is incorporated into the low-polarity resin particles. The complex having a low affinity for the resin particles aggregates inside each of the resin particles during storage of the liquid composition. Thus, when the liquid composition is stored, the luminescence quantum yield is decreased to decrease the luminescence intensity.

The inventors have conducted studies on the incorporation of a unit having a specific polar group into the resin particles. The polar group is at least one selected from the group consisting of an ester group, a carboxy group, a hydroxy group, an ether group, an amino group, an amide group and a cyano group. The resin particles having these polar groups have a high affinity for the high-polarity complex. Thus, the complex is less likely to aggregate inside each of the resin particles. This enables the suppression of a decrease in luminescence intensity even after the liquid composition is stored.

In the present invention, the sulfur-bridged calixarene, which has excellent complex stability, is used as a ligand; thus, the action of incorporating the polar group into the resin particles can be effectively used. In contrast, a β-diketone compound is a bidentate ligand, which has a few sites for coordination and thus is easily detached from the lanthanoid ion. When a polar group is incorporated into the resin particles containing the complex composed of a β-diketone compound and the lanthanoid ion, the ligand is more easily detached. Accordingly, a decrease in luminescence intensity cannot be suppressed after the liquid composition is stored.

As described above, a complex composed of a sulfur-bridged calixarene and a lanthanoid ion is highly stable. Thus, even if a liquid composition containing resin particles in which a polar group is incorporated and a complex is encapsulated is prepared and stored, it is possible to suppress a decrease in luminescence intensity. In addition to this, it was found that the light resistance was improved by using a complex composed of a sulfur-bridged calixarene and a lanthanoid ion, compared with a conventional liquid composition that emits light. This "light resistance" refers to a characteristic that in the case where the liquid composition is placed in an environment affected by light from the outside, even if the cumulated amount of irradiated light (in particular, ultraviolet light) is increased, the luminescence intensity does not decrease easily. The above-described "decrease in luminescence intensity" is a problem caused by the decomposition of the complex regardless of the influence of external light and differs from the "light resistance".

A β-diketone compound serving as a ligand decomposes as the cumulated amount of irradiated ultraviolet light increases. When the β-diketone compound is decomposed, the energy originating from ultraviolet light is not transferred to the lanthanoid ion. Thus, light emission is less likely to occur. The phenolic unit of a methylene-bridged calixarene has high HOMO-LUMO levels and is easily oxidized. Thus, the methylene-bridged calixarene decomposes as the cumulated amount of irradiated ultraviolet light increases. When the methylene-bridged calixarene is decomposed, as with the case of the β-diketone compound, the energy originating from ultraviolet light is not transferred to the lanthanoid ion. Thus, light emission is less likely to occur. For these reasons, the conventional liquid composition that emits light seemingly has low light resistance.

In contrast, the sulfur-bridged calixarene used in the present invention contains a phenolic unit having low HOMO-LUMO levels and thus is not easily oxidized in both the ground and excited states. Thus, in the case of using the sulfur-bridged calixarene, even when it is placed in an environment affected by external light, decomposition due to oxidation is less likely to occur. This seems to result in high light resistance.

Aqueous Liquid Composition (Aqueous Ink)

The "aqueous liquid composition (aqueous ink)" of the present invention contains resin particles containing a complex composed of a sulfur-bridged calixarene and a lanthanoid ion (hereinafter, also referred to as a "lanthanoid complex") and emits light when irradiated with ultraviolet light. Light emission by irradiation with ultraviolet light is attributed to the lanthanoid complex. As with the case of the liquid composition itself, an article produced using the liquid composition emits light when irradiated with ultraviolet light. In this specification, for the sake of convenience, expressions, such as "the liquid composition that emits light when irradiated with ultraviolet light" and "the liquid composition emits light when irradiated with ultraviolet light" are used, the expressions including light emission from the article produced using the liquid composition.

The visible region and the ultraviolet region are not clearly distinguished and various definitions are made. In the present invention, in the case where the visible region and the ultraviolet region needs to be clearly distinguished, the wavelength at the boundary is 400 nm. In this case, in order to emit light, "ultraviolet light" with which the liquid composition is irradiated is a light beam having a wavelength of 400 nm or less. Preferably, the liquid composition of the present invention is colorless or light-colored, i.e., has no substantial absorption in the wavelength range of more than 400 nm.

The liquid composition of the present invention can be suitably used as, for example, an ink or a reagent. In the case where the liquid composition of the present invention is used as an aqueous ink used for various printing methods, such as ink-jet recording and screen printing, it is possible to produce a printed material that emits light when irradiated with ultraviolet light. In the case where the aqueous ink is used in a field where security is required, the aqueous ink is required to be colorless or light-colored under visible light (in the wavelength range of more than 400 nm) and to be difficult to visually recognize. Preferably, a colorant exhibiting a color, such as dye or pigment, is not contained. In the case where the aqueous ink is used in a field where decorativeness is required, such as shine wallpaper, a colorant may be contained as long as light emission by irradiation with ultraviolet light is not prevented. In the field of reagents, the liquid composition of the present invention can be used as an analysis or a detection reagent in which, for example, a detection reagent is incorporated in resin particles in order to detect a target component. The detection reagent can be appropriately selected in accordance with the target component. Examples thereof include antibodies and antigens.

Components that can be used in the liquid composition will be described below. The terms "(meth)acrylic acid", "(meth)acrylate" and "(meth)acrylo" refer to "acrylic acid and methacrylic acid", "acrylate and methacrylate", and "acrylo and methacrylo", respectively.

Resin Particles

Each of the resin particles contains a unit having a polar group (for example, an ester group, a carboxy group, a hydroxy group, an ether group, an amino group, an amide group or a cyano group) and a complex composed of a sulfur-bridged calixarene and a lanthanoid ion. The resin particles can contain, in addition to the lanthanoid complex, a necessary component in accordance with the application of the liquid composition. The liquid composition preferably has a resin particle content (% by mass) of 1.0% by mass or more to 30.0% by mass or less, more preferably 3.0% by mass or more to 20.0% by mass or less based on the total mass of the liquid composition.

The term "resin particles" used in the present invention indicates a resin present in an aqueous medium in the form of particles having a particle size that can be measured by a dynamic light scattering method when the resin is neutralized with an alkali equivalent to the acid value. Whether the resin is in the form of resin particles can be determined according to the method described below. First, a liquid (resin solid content: 10% by mass) containing a resin neutralized with an alkali (for example, sodium hydroxide or potassium hydroxide) equivalent to an acid value is provided. Next, the liquid is diluted 10 times (on a volume basis) with deionized water to prepare a sample solution. In the case where the particle size of the resin can be measured when the resin in the sample solution is subjected to particle size measurement by the dynamic light scattering method, it can be determined that the resin is present in the form of resin particles. The measurement conditions at this time can be set as follows: for example, Set Zero: 30 seconds, the number of measurements: 3 times and measurement time: 180 seconds. As the particle size distribution measuring device, a particle size analyzer (for example, trade name "UPA-EX150", available from Nikkiso Co. Ltd.) using a dynamic light scattering method can be used. Of course, the particle size distribution measuring device and measurement conditions used are not limited to the above.

The resin particles preferably have a volume-average particle size of (nm) 25 nm or more to 600 nm or less, more preferably 50 nm or more to 300 nm or less. The volume-average particle size of the resin particles can be measured under the same conditions as the method for determining whether the resin is in the form of resin particles. The weight-average molecular weight of the resin particles obtained by gel permeation chromatography (GPC) in terms of polystyrene is preferably 3,000 or more to 1,000,000 or less.

Constituent Unit

Each of the resin particles has a unit having a predetermined polar group. The polar group is at least one selected from the group consisting of an ester group, a carboxy group, a hydroxy group, an ether group, an amino group, an amide group and a cyano group. Among these, the polar group is preferably at least one selected from the group consisting of a carboxy group, a hydroxy group, an ether group, an amino group, an amide group and a cyano group, which have higher polarity.

The percentage (% by mass) of the unit having a polar group in each of the resin particles is preferably 5.0% by mass or more, more preferably 10.0% by mass or more, preferably 100.0% by mass or less based on the total mass of the resin particle.

Examples of a monomer to be a unit having a predetermined polar group by polymerization include $\alpha,\beta$-ethylenically unsaturated monomers each having a predetermined polar group. Specific examples of the monomer having a predetermined polar group will be given below. Some of these have two or more types of polar groups. For example, 2-hydroxyethyl methacrylate has a hydroxy group and an ester group, but for convenience, it is exemplified as a specific example of a monomer having a hydroxy group. Thus, in the following description, for the sake of simplicity, a monomer having multiple types of polar groups is exemplified as any of monomers each having a polar group described below, instead of being redundantly described in examples of multiple monomers. The alkyl moiety of a monomer having an alkyl group or a cycloalkyl group preferably has about 1 to 22 carbon atoms.

Examples of a monomer having an ester group (carboxylate group) include alkyl (meth)acrylates, such as methyl (meth)acrylate, ethyl (meth)acrylate, butyl (meth)acrylate, lauryl (meth)acrylate and hexadecyl (meth)acrylate; cycloalkyl (meth)acrylates, such as cyclohexyl (meth)acrylate; crosslinkable monomers each having two ethylenically unsaturated bonds, such as 1,4-butanediol dimethacrylate and ethylene glycol dimethacrylate; and vinyl acetate. Among these, alkyl (meth)acrylates and cycloalkyl (meth)acrylates are preferred. In particular, alkyl (meth)acrylates each containing an alkyl moiety having 1 to 12 carbon atoms and cycloalkyl (meth)acrylates each containing a cycloalkyl moiety having 3 to 12 carbon atoms are preferred.

Examples of a monomer having a carboxy group include (meth)acrylic acid, p-vinylbenzoic acid and β-carboxyethyl (meth)acrylate. Among these, (meth)acrylic acid is preferred.

Examples of a monomer having a hydroxy group include 2-hydroxyethyl (meth)acrylate and 2-hydroxypropyl (meth)acrylate. Among these, 2-hydroxypropyl (meth)acrylate is preferred. While vinyl acetate is described above as an example of a monomer having an ester group, vinyl acetate may be hydrolyzed and then incorporated into the resin particles as a unit having a hydroxy group.

Examples of a monomer having an ether group include 2-methoxyethyl (meth)acrylate, 2-(2-ethoxyethoxy)ethyl (meth)acrylate, glycidyl (meth)acrylate and 4-hydroxybutyl (meth)acrylate glycidyl ether. Among these, 2-methoxyethyl (meth)acrylate and glycidyl (meth)acrylate are preferred. While vinyl acetate is described above as an example of a monomer having an ester group, vinyl acetate may be hydrolyzed to form a hydroxy group, reacted with ketone or aldehyde and incorporated into the resin particles as a unit having an ether group.

Examples of a monomer having an amino group include 2-(dimethylamino)ethyl (meth)acrylate. The hydrogen atom of the amino group may be replaced with, for example, an alkyl group (preferably, an alkyl group having about 1 to 6 carbon atoms). A monomer having an amide group may be hydrolyzed and then incorporated into the resin particles as a unit having an amino group.

Examples of a monomer having an amide group include (meth)acrylamide, N-isopropyl (meth)acrylamide, N,N-dimethyl (meth)acrylamide, N-vinylformamide and N-vinylacetamide. Among these, (meth)acrylamide is preferred.

Examples of a monomer having a cyano group include (meth)acrylonitrile and 2-cyanoethyl (meth)acrylate. Among these, (meth)acrylonitrile is preferred.

Each of the resin particles may have a unit having no polar group in addition to the unit having a predetermined polar group. When the unit having no polar group is used, the percentage (% by mass) of the unit having no polar group in the resin particle is preferably 95.0% by mass or less, more preferably 90.0% by mass or less based on the total mass of the resin particle.

Examples of a monomer to be a unit having no polar group by polymerization include α,β-ethylenically unsaturated monomers having no polar group. Specific examples thereof include alkenes, such as ethylene, propylene and 1,3-butadiene; and monomers that are not substituted with a polar group and that have aromatic groups, such as styrene, α-methylstyrene, o-methylstyrene, m-methylstyrene, p-methylstyrene, 1-vinylnaphthalene, 2-vinylnaphthalene and p-divinylbenzene. Among these, monomers having aromatic groups are preferred. Styrene is more preferred.

The type of resin that forms resin particles is not particularly limited as long as the resin has a predetermined polar group. In particular, a resin having a high affinity for the lanthanoid complex is preferred. Specific examples thereof include acrylic resins and urethane-based resins. Acrylic resins are preferred. Other than these, for example, polyvinyl butyral resins can also be used.

Lanthanoid Complex

Each resin particle contains a complex composed of a sulfur-bridged calixarene and a lanthanoid ion. That is, at least part of the lanthanoid complex needs to be incorporated (encapsulated) in the resin particle. From the viewpoint of the luminescence quantum yield, the lanthanoid complex is preferably present in a monomolecular form inside the resin particle without aggregated or crystallized. The resin particle preferably has a lanthanoid complex content (% by mass) of 0.01% by mass or more to 90.00% by mass or less, 0.10% by mass or more to 50.00% by mass or less based on the total mass of the resin particle. The liquid composition preferably has a lanthanoid complex content (% by mass) of 0.001% by mass or more to 1.0% by mass or less, more preferably 0.01% by mass or more to 0.5% by mass or less based on the total mass of the liquid composition.

Whether the resin particle contains the lanthanoid complex and the compositions of the resin particle and the lanthanoid complex can be determined according to methods described below. A method for extracting and analyzing resin particles from a liquid composition will be described below. Resin particles extracted, for example, from a resin particle dispersion can also be analyzed in the same manner.

The resin particles are separated from the liquid composition by a density gradient centrifugation method. The density gradient centrifugation method includes a density gradient sedimentation velocity method and a density gradient sedimentation equilibrium method. In the density gradient sedimentation velocity method, the resin particles are separated and extracted in accordance with a difference in sedimentation coefficient between components. In the density gradient sedimentation equilibrium method, the resin particles are separated and extracted in accordance with a difference in density between components. The extracted resin particles are washed, as needed and then subjected to the following analyses.

Whether the resin particles contain the lanthanoid complex can be determined according to a method described below. A dispersion prepared by dispersing the resin particles, obtained according to the above procedure, in water is irradiated with ultraviolet light in the wavelength range of 250 to 400 nm and examined for the presence or absence of light emission. In the case where the resin particles contain the lanthanoid complex composed of a ligand and a lanthanoid ion, light emission corresponding to a specific lanthanoid ion is observed regardless of the type of ligand. In the case where the resin particles do not contain the lanthanoid complex, no emission peak is observed.

The compositions of the resin particles and the lanthanoid complex can be analyzed in accordance with methods described below. The resin particles obtained by the above procedure are dried and solidified. The resulting resin particles containing the lanthanoid complex are dissolved in an organic solvent capable of dissolving both the lanthanoid complex and the resin to prepare a sample. The lanthanoid complex and the resin in the sample are separated by, for example, gel permeation chromatography (GPC), high-performance liquid chromatography (HPLC) or column chromatography. Elemental analysis is performed on the separated lanthanoid complex and resin using, for example, nuclear magnetic resonance (NMR) spectroscopy, matrix-assisted laser desorption/ionization mass spectrometry (MALDI-MS) or X-ray crystal structure analysis. From this, the type and percentage of the constituent unit of the resin and the structure of the lanthanoid complex can be identified. In addition to the above, inductively-coupled plasma optical emission spectroscopy (ICP-OES) or inductively-coupled plasma mass spectrometry (ICP-MS) may be used for the quantitative analysis of the lanthanoid ion. The composition of the resin can be easily analyzed by pyrolysis gas chromatography because a monomer generated by depolymerization can be detected.

Lanthanoid

Lanthanoids are metallic elements with atomic numbers of 57 to 71. A lanthanoid ion is a cation of a lanthanoid.

When some lanthanoid ions are irradiated with ultraviolet light, even in an uncomplexed state, they absorb the energy, are excited to an excited state and emit light in wavelength regions specific to the ions upon returning to the ground state. For example, $Gd^{3+}$ emits light in the ultraviolet region, $Eu^{2+}$ emits light in the blue region, $Tb^{3+}$ and $Dy^{3+}$ emit light in the green region, $Sm^{3+}$ and $Eu^{3+}$ emit light in the red region and $Pr^{3+}$, $Nd^{3+}$, $Er^{3+}$, $Ho^{3+}$ and $Tm^{3+}$ emit light in the near infrared region. However, a lanthanoid ion that does not form a complex, particularly a trivalent lanthanoid ion, has low light absorption efficiency and emits weak light. To obtain stronger light emission, a complex composed of a ligand having a large molar absorption coefficient and a lanthanoid ion is used. When the lanthanoid complex is irradiated with ultraviolet light, the ligand absorbs the energy. The energy is transferred to the lanthanoid ion to excite the lanthanoid ion to an excited state. When the lanthanoid ion returns to the ground state, intense light is emitted. A lanthanoid complex containing a ligand that absorbs almost no light in the visible region and that mainly absorbs light in the ultraviolet region is colorless under visible light and emits light when irradiated with ultraviolet light.

Sulfur-Bridged Calixarene

A sulfur-bridged calixarene can coordinate with multiple lanthanoid ions in one molecule. Thus, a lanthanoid complex formed has high stability. A larger molecular weight of the lanthanoid complex results in a higher cohesive force between the lanthanoid complexes and a lower affinity for the resin. Accordingly, one lanthanoid complex preferably contains one or two molecules of the sulfur-bridged calixarene.

The lanthanoid complex preferably has a structure represented by general formula (1) below. The structure represented by general formula (1) is a partial structure of the lanthanoid complex. A counter ion binds to the structure represented by general formula (1) to form an electrically neutralized complex.

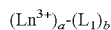

(1)

(where in general formula (1), each Ln is independently Sm, Eu, Tb or Dy, each $L_1$ is independently a sulfur-bridged calixarene, a is an integer of 1 or more to 4 or less and b is an integer of 1 or 2).

Each Ln in general formula (1) is independently Sm, Eu, Tb or Dy. Among the lanthanoid ions, $Sm^{3+}$, $Eu^{3+}$, $Tb^{3+}$ and $Dy^{3+}$ are excellent in luminescence intensity. For this reason, light emission can be easily confirmed visually even on printed materials made using a recording medium on which light emission is not easily recognized, such as a recording medium that contains a fluorescent whitening agent for increasing whiteness.

Each $L_1$ in general formula (1) is independently a sulfur-bridged calixarene. Specific examples of a structure denoted by $L_1$ include A1 to A19 illustrated below. The sulfur-bridged calixarene represented by $L_1$ is not limited to the structures illustrated below as long as it is included in the definition in the present invention. Here, although at least a subset of OH groups or COOH groups in A1 to A19 is O⁻ or COO⁻, it is described as OH or COOH, for the sake of convenience.

$L_1$ preferably has a structure represented by general formula (2). Each X is a cross-linking group and is independently S, SO or $SO_2$. Each $R_1$ is independently a hydrogen atom or an alkyl group having 1 or more to 8 or less carbon atoms. Examples of the alkyl group include a methyl group, an ethyl group, a tert-butyl group and 1,1,3,3-tetramethyl-butyl group. Each Z is independently O⁻ or OM. Each M is independently a hydrogen atom, an alkali metal (for example, lithium, sodium or potassium), ammonium or an organic ammonium. n is an integer of 4 or more to 8 or less. In the case of a structure in which a hydroxy group is not etherified (that is, when each Z is O⁻ or OM), the hydroxy group in $L_1$ changes to a phenolate anion and binds strongly to the lanthanoid ion. Thus, the energy is efficiently transferred, resulting in excellent luminescence intensity. Since the number n of phenolic units is 4 or more to 8 or less, the stability of the lanthanoid complex is easily enhanced. Specific examples of the structure represented by general formula (2) are A5 to A19.

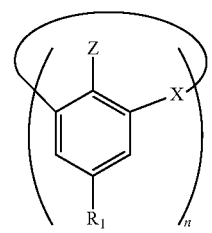

(2)

(where in general formula (2), each X is independently S, SO or $SO_2$, each $R_1$ is independently a hydrogen atom or an alkyl group having 1 or more to 8 or less carbon atoms, each Z is independently O⁻ or OM, each M is independently a hydrogen atom, an alkali metal, ammonium or an organic ammonium and n is an integer of 4 or more to 8 or less).

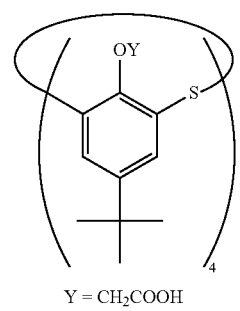

A1

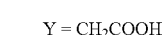

Y = $CH_2COOH$

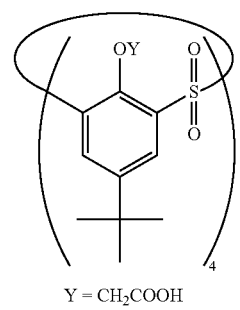

A2

Y = $CH_2COOH$

A3
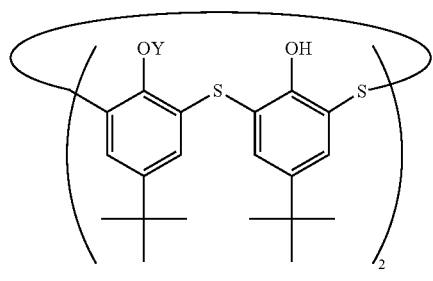
Y = CH₂COOH
A4
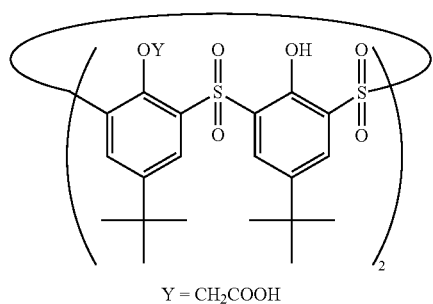
Y = CH₂COOH
A5
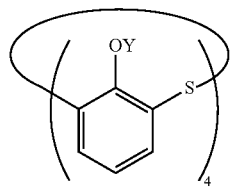
A6
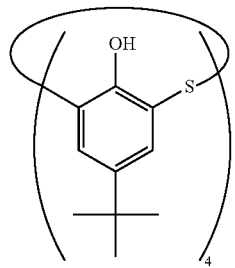
A7
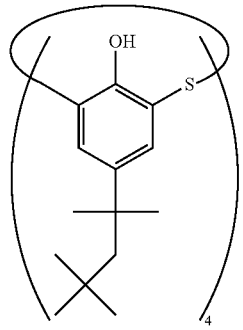
A8
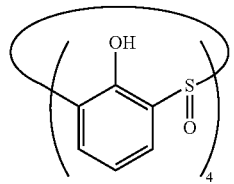
A9
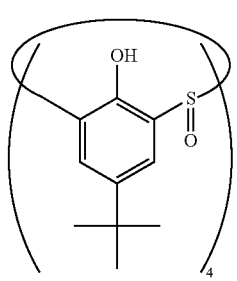
A10
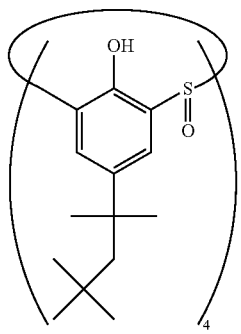
A11
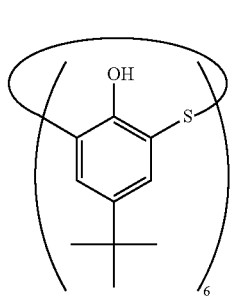
A12
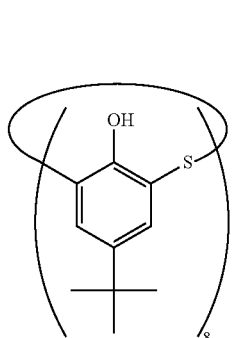
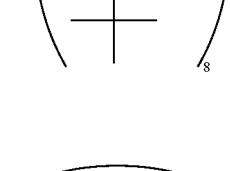
A13
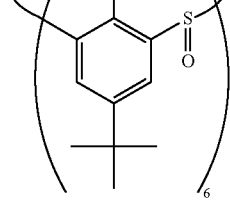

-continued

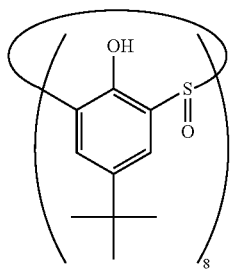
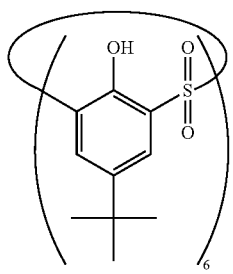
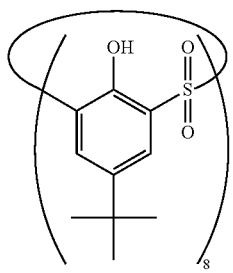
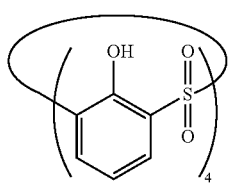
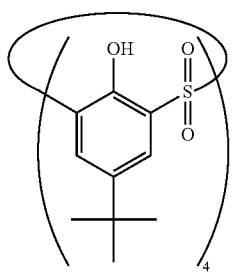
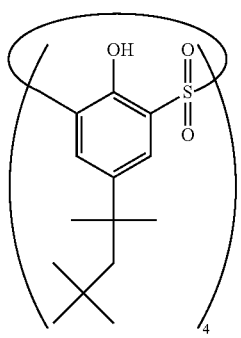

In the present invention, preferably, in general formula (1), each Ln is Eu, a is 4 and b is 2, and in general formula (2), each X is $SO_2$ and n is 4. The reason for this is as follows: Among $Sm^{3+}$ and $Eu^{3+}$ that emit red light, $Eu^{3+}$ has higher luminous efficiency and excellent visual recognizability. The sulfur-bridged calixarene, which is suitable for the excitation energy level of $Eu^{3+}$ and is not easily oxidized, has a structure crosslinked with $SO_2$ that is highly electron-withdrawing. In addition, in the case where n is 4, the complex has an appropriate molecular weight, does not easily aggregate and has satisfactory luminous efficiency and excellent visual recognizability.

Preferably, in general formula (1), each Ln is Tb and a is 2 and in general formula (2), each X is $SO_2$ and n is 4. The reason for this is as follows: Among $Tb^{3+}$ and $Dy^{3+}$ that emit green light, $Tb^{3+}$ has higher luminous efficiency and excellent visual recognizability. The sulfur-bridged calixarene, which is suitable for the excitation energy level of $Tb^{3+}$ and is not easily oxidized, has a structure crosslinked with $SO_2$ that is highly electron-withdrawing. In addition, in the case where n is 4, the complex has an appropriate molecular weight, does not easily aggregate and has satisfactory luminous efficiency and excellent visual recognizability. Unlike $Eu^{3+}$ described above, $Tb^{3+}$ is less affected by b in general formula (1).

Production Method

A method for producing resin particles containing a lanthanoid complex will be described. A method for synthesizing resin particles is not particularly limited. A known method, such as an emulsion polymerization method, a miniemulsion polymerization method, a seed polymerization method or a phase-inversion emulsification method, can be used. In the emulsion polymerization method, a monomer and a surfactant are added to water. An aqueous solution of a polymerization initiator is further added to polymerize the monomer to obtain resin particles. In the miniemulsion polymerization method, a monomer and a polymerization initiator are added to water. A shearing force is applied to the mixture with an emulsifying and dispersing machine, such as a homogenizer, to emulsify the monomer, thereby forming fine droplets. Polymerization is performed to provide resin particles. In the seed polymerization method, polymerization is performed while a monomer and a polymerization initiator are added dropwise to an aqueous dispersion of seed particles composed of a resin and an inorganic compound, thereby providing resin particles having a core-shell structure.

A lanthanoid complex may be encapsulated in each resin particles by adding the lanthanoid complex together with the monomer and performing polymerization. Alternatively, resin particles may be dyed with the lanthanoid complex by a known method described in, for example, Patent Literature 1.

Resin particles containing a lanthanoid complex are preferably prepared by the phase-inversion emulsification method because of its high degree of freedom in selecting a resin or a lanthanoid complex. The details will be described below. A resin and a lanthanoid complex are provided and dissolved in an organic solvent immiscible with water. Examples of the organic solvent immiscible with water include ethyl acetate, toluene and chloroform. Subsequently, an aqueous solution of a surfactant is added to the solution. A shearing force is applied to the mixture with an emulsifying and dispersing machine until a desired size is obtained, thereby emulsifying the components. When a resin having an ionic group is used, the self-emulsifying ability of the resin can be used without adding an aqueous solution of a surfactant. As the emulsifying and dispersing machine, a machine that applies a shearing force by ultrasonic irradiation, high-speed stirring, high-pressure injection or the like is preferred. Then the organic solvent is removed under reduced pressure to prepare a dispersion of lanthanoid complex-containing resin particles dispersed in water.

Aqueous Medium

The liquid composition contains water or an aqueous medium that is a mixed medium of water and an aqueous organic solvent. As the water, deionized water (ion-exchanged water) is preferably used. The water content (% by mass) of the liquid composition is preferably 50.0% by mass or more to 95.0% by mass or less based on the total mass of the liquid composition. The water-soluble organic solvent is not particularly limited and alcohols, glycols, glycol ethers, nitrogen-containing compounds and so forth can be used. The water-soluble organic solvent content (% by mass) of the liquid composition is preferably 3.0% by mass or more to 50.0% by mass or less based on the total mass of the liquid composition.

Other Components

The liquid composition may contain various additives, such as a humectant, a surfactant, a pH modifier, an antifoaming agent, an anticorrosive, a preservative, an antifungal agent, an antioxidant, an anti-reducing agent, a chelating agent and other resins, in accordance with the properties required for its application.

EXAMPLES

While the present invention will be described in more detail below by examples and comparative examples, the present invention is not limited to the following examples so long as the invention does not depart from the scope thereof. Regarding the amount of a component, "part(s)" and "%" are expressed on a mass basis unless otherwise specified.

Synthesis of Resin

Resin 1 to 11

Into flasks each equipped with a stirrer, a nitrogen inlet, a reflux condenser and a thermometer, 200 parts of isopropanol was placed. The temperature was increased to 85° C. under stirring in a nitrogen atmosphere. Solutions each containing a corresponding one of the monomers presented on the left side of Table 1 and 2.0 parts of a polymerization initiator (trade name "V-95", available from Wako Pure Chemical Industries, Ltd.) were added dropwise to the respective flasks over a period of 2 hours while the inside of each of the flasks was maintained at 80° C. The mixtures were continued to stir for 4 hours while maintained at 80° C. Isopropanol was removed under reduced pressure to provide resins 1 to 11 composed of units originating from the monomers described in Table 1.

Resin 12

A commercially available polyvinyl butyral resin (trade name "S-LEC BL-11", available from Sekisui Chemical Co., Ltd.) was used as a resin 12. The resin 12 is prepared by modifying a polyvinyl alcohol with butyl aldehyde and has a butyral unit containing two ether groups and a vinyl alcohol unit containing a hydroxy group.

Resin 13

Polymerization was performed in the presence of a surfactant according to the description in Example 3 of Patent Literature 1 to synthesize a resin 13 that was an acrylic acid-acrylonitrile-styrene copolymer (copolymerization ratio {ratio by mass}=10.0/27.0/63.0).

Resin 14

A resin 14 that was a polyester resin was synthesized according to the description in Example 1 of Patent Literature 2.

TABLE 1

Composition and property of resin

| Resin | Percentage of monomer (unit) (%) | | | | | | | | | | | | Percentage of unit containing polar group (%) | Percentage of unit containing no polar group (%) |
| --- | --- | --- | --- | --- | --- | --- | --- | --- | --- | --- | --- | --- | --- | --- |
| | EMA | CHMA | BMA | AA | MAA | HEMA | MEMA | GMA | DMAEA | AAm | AN | St | | |
| 1 | 40.0 | 50.0 | | 10.0 | | | | | | | | | 100.0 | 0.0 |
| 2 | | | 40.0 | | 10.0 | | | | | | | 50.0 | 50.0 | 50.0 |
| 3 | | | | 5.0 | | | | | | | | 95.0 | 5.0 | 95.0 |
| 4 | | | | | | 5.0 | | | | | | 95.0 | 5.0 | 95.0 |
| 5 | | | | | | | 5.0 | | | | | 95.0 | 5.0 | 95.0 |
| 6 | | | | | | | | 5.0 | | | | 95.0 | 5.0 | 95.0 |
| 7 | | | | | | | | | 5.0 | | | 95.0 | 5.0 | 95.0 |
| 8 | | | | | | | | | | 5.0 | | 95.0 | 5.0 | 95.0 |
| 9 | | | | | | | | | | | 5.0 | 95.0 | 5.0 | 95.0 |
| 10 | 5.0 | | | | | | | | | | | 95.0 | 5.0 | 95.0 |
| 11 | | | | | | | | | | | | 100.0 | 0.0 | 100.0 |

Preparation of Ligand

The following ligands were prepared.

A3

A3 was synthesized from A6 (available from Tokyo Chemical Industry Co., Ltd.) serving as a raw material according to the description in Tetrahedron Letters, 2007, 48(5), pp. 821-825.

A4

A4 was synthesized from A6 (available from Tokyo Chemical Industry Co., Ltd.) serving as a raw material according to the description in Tetrahedron Letters, 2007, 48(5), pp. 821-825.

A6

A6 was obtained from Tokyo Chemical Industry Co., Ltd.

A9

A9 was synthesized from A6 (available from Tokyo Chemical Industry Co., Ltd.) serving as a raw material according to the description in Japanese Patent Laid-Open No. 2000-107505.

A17

A5 was synthesized from A6 (available from Tokyo Chemical Industry Co., Ltd.) serving as a raw material according to the description in Japanese Patent Laid-Open No. 2014-019670. Subsequently, A17 was synthesized from A5 serving as a raw material according to the description in U.S. Patent Application Publication No. 2013/299423.

A18

A18 was obtained from Tokyo Chemical Industry Co., Ltd.

A19

A19 was synthesized according to the description in Japanese Patent Laid-Open No. 2000-107505.

B1

B1 having a structure illustrated below was synthesized according to the description in Journal of Solid State Chemistry, 2017, 251, pp. 26-32.

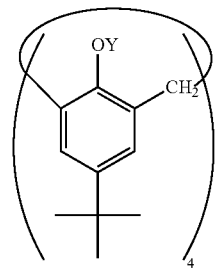

B1

Y = CH$_2$COOH

B2

B2 having a structure illustrated below was obtained from Tokyo Chemical Industry Co., Ltd.

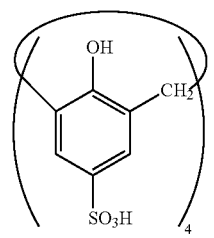

B2

Synthesis of Complex

Complexes were synthesized with the ligands prepared as above.

Complex 1

A complex 1 having a structure represented by $(Eu^{3+})_4$-$(A18)_2$ was synthesized according to the description in Inorganic Chemistry, 2006, 45(13), pp. 4880-4882.

Complex 2

A complex 2 having a structure represented by $(Eu^{3+})_4$-$(A17)_2$ was synthesized in the same procedure as in the synthesis of the complex 1, except that the ligand was changed to A17.

Complex 3

A complex 3 having a structure represented by $(Eu^{3+})_4$-$(A19)_2$ was synthesized in the same procedure as in the synthesis of the complex 1, except that the ligand was changed to A19.

Complex 4

A complex 4 having a structure represented by $(Sm^{3+})_8$-$(A18)_4$ was synthesized according to the description in Angewandte Chemie International Edition, 2004, 43, pp. 1832-1835.

Complex 5

A complex 5 having a structure represented by $(Sm^{3+})_4$-$(A6)_2$ was synthesized according to the description in Inorganic Chemistry, 2009, 48(24), pp. 11743-11747.

Complex 6

A complex 6 having a structure represented by $(Tb^{3+})_2$-$(A18)_2$ was synthesized according to the description in Inorganic Chemistry, 2006, 45(13), pp. 4880-4882.

Complex 7

A complex 7 having a structure represented by $(Tb^{3+})_2$-$(A17)_2$ was synthesized in the same procedure as in the synthesis of the complex 6, except that the ligand was changed to A17.

Complex 8

A complex 8 having a structure represented by $(Tb^{3+})_2$-$(A19)_2$ was synthesized in the same procedure as in the synthesis of the complex 6, except that the ligand was changed to A19.

Complex 9

A complex 9 having a structure represented by $(Tb^{3+})_2$-$(A18)$ was synthesized according to the description in European Journal of Inorganic Chemistry, 2008, pp. 5565-5568.

Complex 10

A complex 10 having a structure represented by $(Tb^{3+})_2$-$(A9)_2$ was synthesized in the same procedure as in the synthesis of the complex 6, except that the ligand was changed to A9.

Complex 11

A complex 11 having a structure represented by $(Tb^{3+})_4$-$(A6)_2$ was synthesized in the same procedure as in the synthesis of the complex 5, the lanthanoid ion was changed to $Tb^{3+}$.

Complex 12

A complex 12 having a structure represented by $(Tb^{3+})$-$(A4)$ was synthesized according to the description in Tetrahedron Letters, 2007, 48(5), pp. 821-825.

Complex 13

A complex 13 having a structure represented by $(Tb^{3+})$-$(A3)$ was synthesized in the same procedure as in the synthesis of the complex 12, except that the ligand was changed to A3.

Complex 14

A complex 14 having a structure represented by $(Dy^{3+})_2$-$(A18)_2$ was synthesized in the same procedure as in the synthesis of the complex 6, except that the lanthanoid ion was changed to $Dy^{3+}$.

Complex 15

A complex 15 having a structure represented by $(Dy^{3+})_4$-$(A18)_2$ was synthesized in the same procedure as in the synthesis of the complex 5, except that the lanthanoid ion was changed to $Dy^{3+}$.

Complex 16

A complex 16 having a structure represented by $(Tb^{3+})$-$(B1)$ was synthesized according to the description in Journal of Solid State Chemistry, 2017, 251, pp. 26-32.

Complex 17

A complex 17 having a structure represented by $(Tb^{3+})$-$(B2)_2$ was synthesized according to the description in Chemistry Letters, 1993, 22(7), pp. 1261-1264.

Complex 18

Tris[4,4,4-trifluoro-1-(2-thienyl)-1,3-butandionato]europium (III) (available from ACROS ORGANICS) was used as a complex 18. The complex 18 is a β-diketone compound.

Complex 19

[Tetra(n-butyl)ammonium][tetrakis(4,4,4-trifluoro-1-phenyl-1,3-butanedionato)europate (-1)] was synthesized according to the description in Patent Literature 2 and used as a complex 19. The complex 19 is a β-diketone compound.

Preparation of Resin Particles

Resin Particles 1 to 33

The types and amounts of resins and complexes described in Table 2 were added to 40.00 parts of ethyl acetate and sufficiently dissolved therein to prepare liquids 1. However, no complex was used to prepare resin particles 30, 31 and 33. Separately, 0.05 parts of sodium dodecyl sulfate was dissolved in 100.00 parts of deionized water to prepare a liquid 2. The liquid 2 was added to the liquid 1. The mixture was stirred for 10 minutes and then the components were emulsified with an ultrasonic irradiator (trade name "digital Sonifier S-150D", available from Branson) at an output power of 50 W and a frequency of 20 kHz for 30 minutes. Ethyl acetate was removed by evaporation with a rotary evaporator and then water was removed under reduced pressure. Thereby, aqueous dispersions of resin particles were prepared, each of the aqueous dispersions having a resin particle content of 20.0%. The resulting resin particles 1 to 29 and 32 prepared using the complexes contained the respective complexes inside thereof.

Resin Particles 34

Resin particles 34 were prepared according to the description in Example 3 of Patent Literature 1, except that the amounts of resin and complex used were changed as described in Table 2. An appropriate amount of water was added to adjust the concentration, thereby preparing an aqueous dispersion of the resin particles 34, the aqueous dispersion having a resin particle content of 20.0%. The resin particles 34 contained the complex 18 inside thereof.

Resin Particles 35

Resin particles 35 were prepared according to the description in Example 1 of Patent Literature 2, except that the amounts of resin and complex used were changed as described in Table 2. An appropriate amount of water was added to adjust the concentration, thereby preparing an aqueous dispersion of the resin particles 35, the aqueous dispersion having a resin particle content of 20.0%. The resin particles 35 contained the complex 19 inside thereof.

TABLE 2

Synthesis condition and property of resin particle

| Resin particle | Resin Type | Resin Amount used (parts) | Complex Type | Complex Amount used (parts) | Percentage of complex (%) |
|---|---|---|---|---|---|
| 1 | 1 | 9.90 | 1 | 0.10 | 1.00 |
| 2 | 1 | 9.90 | 2 | 0.10 | 1.00 |
| 3 | 1 | 9.90 | 3 | 0.10 | 1.00 |
| 4 | 1 | 9.90 | 4 | 0.10 | 1.00 |
| 5 | 1 | 9.90 | 5 | 0.10 | 1.00 |
| 6 | 1 | 9.90 | 6 | 0.10 | 1.00 |
| 7 | 1 | 9.90 | 7 | 0.10 | 1.00 |
| 8 | 1 | 9.90 | 8 | 0.10 | 1.00 |
| 9 | 1 | 9.90 | 9 | 0.10 | 1.00 |
| 10 | 1 | 9.90 | 10 | 0.10 | 1.00 |
| 11 | 1 | 9.90 | 11 | 0.10 | 1.00 |
| 12 | 1 | 9.90 | 12 | 0.10 | 1.00 |
| 13 | 1 | 9.90 | 13 | 0.10 | 1.00 |
| 14 | 1 | 9.90 | 14 | 0.10 | 1.00 |
| 15 | 1 | 9.90 | 15 | 0.10 | 1.00 |
| 16 | 1 | 9.99 | 1 | 0.01 | 0.10 |
| 17 | 1 | 9.00 | 1 | 1.00 | 10.00 |
| 18 | 2 | 9.90 | 1 | 0.10 | 1.00 |
| 19 | 3 | 9.90 | 1 | 0.10 | 1.00 |
| 20 | 4 | 9.90 | 1 | 0.10 | 1.00 |
| 21 | 5 | 9.90 | 1 | 0.10 | 1.00 |

TABLE 2-continued

Synthesis condition and property of resin particle

| Resin particle | Resin Type | Resin Amount used (parts) | Complex Type | Complex Amount used (parts) | Percentage of complex (%) |
|---|---|---|---|---|---|
| 22 | 6 | 9.90 | 1 | 0.10 | 1.00 |
| 23 | 7 | 9.90 | 1 | 0.10 | 1.00 |
| 24 | 8 | 9.90 | 1 | 0.10 | 1.00 |
| 25 | 9 | 9.90 | 1 | 0.10 | 1.00 |
| 26 | 10 | 9.90 | 1 | 0.10 | 1.00 |
| 27 | 13 | 9.90 | 1 | 0.10 | 1.00 |
| 28 | 11 | 9.90 | 1 | 0.10 | 1.00 |
| 29 | 11 | 9.90 | 6 | 0.10 | 1.00 |
| 30 | 1 | 10.00 | — | 0.00 | 0.00 |
| 31 | 1 | 10.00 | — | 0.00 | 0.00 |
| 32 | 1 | 9.90 | 16 | 0.10 | 1.00 |
| 33 | 1 | 10.00 | — | 0.00 | 0.00 |
| 34 | 12 | 9.90 | 18 | 0.10 | 1.00 |
| 35 | 14 | 9.90 | 19 | 0.10 | 1.00 |

Example A: Aqueous Ink (for Ink Jet)

Preparation of Ink

Components presented on the left side of Table 3 were mixed. The mixture was sufficiently stirred and then stirred with a magnetic stirrer for 30 minutes. The mixture was filtered under pressure through a microfilter having a pore size of 3.0 μm (available from Fujifilm Corporation). Thereby, inks were prepared. In Table 3, polyethylene glycol has a number-average molecular weight of 1,000. Acetylenol E100 is a trade name of a nonionic surfactant available from Kawaken Fine Chemicals Co., Ltd.

Evaluation

The following evaluations were performed for each of the inks prepared above. Each of the inks was irradiated with ultraviolet light having a wavelength suitably selected for excitation of a corresponding one of the ligands in the wavelength range of 250 to 400 nm. The emission detection wavelength was set, according to the type of lanthanoid ion, to 643 nm for $Sm^{3+}$, 614 nm for $Eu^{3+}$, 544 nm for $Tb^{3+}$ and 570 nm for $Dy^{3+}$. In the present invention, in the following evaluation criteria of each evaluation, A or B denote an acceptable level and C denotes an unacceptable level. The evaluation results are presented on the right side of Table 3.

Evaluation 1: Suppression of Decrease in Luminescence Intensity

A small amount of ink was collected from each of the inks prepared above and diluted with ion-exchanged water so as to have a resin particle content of $1.0 \times 10^{-3}\%$ to prepare a sample. The luminescence intensity $I_1$ of the sample was measured with a fluorescence spectrophotometer (trade name "FP-750", available from JASCO Corporation). Next, 80 mL of the remaining ink was placed into a 100-mL screw-cap bottle (heat resistant). The bottle was tightly sealed, placed in an oven at 70° C. and stored for two weeks (an accelerated test in a dark place). After that, the ink was removed from the oven and returned to normal temperature (25° C.). Then a small amount of the ink was again collected. Similarly to the above case, the ink was diluted with ion-exchanged water to prepare a sample and then the luminescence intensity 12 of the sample was measured. The value of the luminescence intensity ratio $(\%) = (I_2/I_1) \times 100$ was calculated. The suppression of a decrease in luminescence intensity was evaluated according to the following evaluation criteria.

A: The luminescence intensity ratio was 80% or more.
B: The luminescence intensity ratio was 60% or more to less than 80%.
C: The luminescence intensity ratio was less than 60%.

Evaluation 2: Light Resistance

Each of the inks prepared above was charged into an ink cartridge. The ink cartridge was mounted on an ink-jet recording device (trade name "PIXUS iP2700", available from CANON KABUSHIKI KAISHA) equipped with a recording head that ejects ink by the action of heat energy. In this example, an image recorded in such a manner that one ink droplet having a mass of 25 ng±10% per droplet is applied to a unit region (1/600 inches×1/600 inches) is defined as a recording duty of 100%. Solid images (2 cm×2 cm per line) each having a recording duty of 100% were recorded on two sheets of a recording medium (plain paper, trade name "Shiraoi", basis weight: 104.7 g/m², no fluorescent whitening agent, available from Nippon Paper Industries Co., Ltd.) with the ink-jet recording device. One day after the recording, the solid image on one of the sheets was placed for 48 hours in a dark place that did not affected by ultraviolet light. The solid image on the other sheet was irradiated with ultraviolet light for 48 hours with an ultraviolet lamp (trade name "SLUV-4", available from As One Corporation, wavelength: 365 nm, intensity: 0.74 mW/cm² at 50 mm from light source). The irradiation with ultraviolet light is not irradiation for allowing the liquid composition to emit light, but is an accelerated test in an assumed situation where the cumulated amount of irradiated light increases. After that, the luminescence intensity of each of the two types of the solid images was measured with a fluorescence spectrophotometer (trade name "FP-750", available from JASCO Corporation). Letting the luminescence intensity of the solid image placed in the dark place be $I_d$ and letting the luminescence intensity of the solid image irradiated with ultraviolet light be $I_{UV}$, the value of the luminescence intensity ratio $(\%) = (I_{UV}/I_d) \times 100$ was calculated. The light resistance was evaluated according to the following evaluation criteria.

A: The luminescence intensity ratio was 80% or more.
B: The luminescence intensity ratio was 60% or more to less than 80%.
C: The luminescence intensity ratio was less than 60%.

TABLE 3

Evaluation condition and evaluation result of ink

| | | Type of resin particle | Aqueous dispersion of resin particle | Complex 1 | Complex 6 | Complex 17 | Composition (%) Glycerol | Polyethylene glycol | 1,2-Hexanediol | Acetylenol E100 | Ion-exchanged water | Evaluation result Suppression of decrease in luminescence intensity | Light resistance |
|---|---|---|---|---|---|---|---|---|---|---|---|---|---|
| Example | 1 | 1 | 25.0 | | | | 10.0 | 5.0 | 5.0 | 0.5 | 54.5 | A | A |
| | 2 | 2 | 25.0 | | | | 10.0 | 5.0 | 5.0 | 0.5 | 54.5 | A | A |
| | 3 | 3 | 25.0 | | | | 10.0 | 5.0 | 5.0 | 0.5 | 54.5 | A | A |
| | 4 | 4 | 25.0 | | | | 10.0 | 5.0 | 5.0 | 0.5 | 54.5 | B | A |
| | 5 | 5 | 25.0 | | | | 10.0 | 5.0 | 5.0 | 0.5 | 54.5 | A | A |
| | 6 | 6 | 25.0 | | | | 10.0 | 5.0 | 5.0 | 0.5 | 54.5 | A | A |
| | 7 | 7 | 25.0 | | | | 10.0 | 5.0 | 5.0 | 0.5 | 54.5 | A | A |
| | 8 | 8 | 25.0 | | | | 10.0 | 5.0 | 5.0 | 0.5 | 54.5 | A | A |
| | 9 | 9 | 25.0 | | | | 10.0 | 5.0 | 5.0 | 0.5 | 54.5 | A | A |
| | 10 | 10 | 25.0 | | | | 10.0 | 5.0 | 5.0 | 0.5 | 54.5 | A | A |
| | 11 | 11 | 25.0 | | | | 10.0 | 5.0 | 5.0 | 0.5 | 54.5 | A | A |
| | 12 | 12 | 25.0 | | | | 10.0 | 5.0 | 5.0 | 0.5 | 54.5 | B | A |
| | 13 | 13 | 25.0 | | | | 10.0 | 5.0 | 5.0 | 0.5 | 54.5 | B | A |
| | 14 | 14 | 25.0 | | | | 10.0 | 5.0 | 5.0 | 0.5 | 54.5 | A | A |
| | 15 | 15 | 25.0 | | | | 10.0 | 5.0 | 5.0 | 0.5 | 54.5 | A | A |
| | 16 | 16 | 25.0 | | | | 10.0 | 5.0 | 5.0 | 0.5 | 54.5 | A | A |
| | 17 | 17 | 25.0 | | | | 10.0 | 5.0 | 5.0 | 0.5 | 54.5 | A | A |
| | 18 | 18 | 25.0 | | | | 10.0 | 5.0 | 5.0 | 0.5 | 54.5 | A | A |
| | 19 | 19 | 25.0 | | | | 10.0 | 5.0 | 5.0 | 0.5 | 54.5 | A | A |
| | 20 | 20 | 25.0 | | | | 10.0 | 5.0 | 5.0 | 0.5 | 54.5 | A | A |
| | 21 | 21 | 25.0 | | | | 10.0 | 5.0 | 5.0 | 0.5 | 54.5 | A | A |
| | 22 | 22 | 25.0 | | | | 10.0 | 5.0 | 5.0 | 0.5 | 54.5 | A | A |
| | 23 | 23 | 25.0 | | | | 10.0 | 5.0 | 5.0 | 0.5 | 54.5 | A | A |
| | 24 | 24 | 25.0 | | | | 10.0 | 5.0 | 5.0 | 0.5 | 54.5 | A | A |
| | 25 | 25 | 25.0 | | | | 10.0 | 5.0 | 5.0 | 0.5 | 54.5 | A | A |
| | 26 | 26 | 25.0 | | | | 10.0 | 5.0 | 5.0 | 0.5 | 54.5 | B | A |
| | 27 | 27 | 25.0 | | | | 10.0 | 5.0 | 5.0 | 0.5 | 54.5 | A | A |
| Comparative example | 1 | 28 | 25.0 | | | | 10.0 | 5.0 | 5.0 | 0.5 | 54.5 | C | A |
| | 2 | 29 | 25.0 | | | | 10.0 | 5.0 | 5.0 | 0.5 | 54.5 | C | A |
| | 3 | 30 | 25.0 | 0.05 | | | 10.0 | 5.0 | 30.0 | 0.5 | 29.45 | C | A |
| | 4 | 31 | 25.0 | | 0.05 | | 10.0 | 5.0 | 30.0 | 0.5 | 29.45 | C | A |
| | 5 | 32 | 25.0 | | | | 10.0 | 5.0 | 5.0 | 0.5 | 54.5 | C | C |
| | 6 | 33 | 25.0 | | | 0.05 | 10.0 | 5.0 | 5.0 | 0.5 | 54.45 | C | C |
| | 7 | 34 | 25.0 | | | | 10.0 | 5.0 | 5.0 | 0.5 | 54.5 | C | C |
| | 8 | 35 | 25.0 | | | | 10.0 | 5.0 | 5.0 | 0.5 | 54.5 | C | C |

The relationship between the type of lanthanoid ion and the visual recognizability of light emission was examined using the solid images (placed in the dark place) prepared for the evaluation of light resistance. Among Examples 1 to 5, the visual recognizability in Examples 1 to 3 was relatively good, compared with Examples 4 and 5. Among Examples 6 to 15, the visual recognizability in Examples 6 to 13 was relatively good, compared with Examples 14 and 15.

Example B: Aqueous Ink (for Screen Printing)

An aqueous ink for screen printing was prepared with reference to the description in PCT Japanese Translation Patent Publication No. 06-509599. Specifically, the ink was prepared in the same way as above, except that the "pigment dispersion" having the ink composition described in Example 1 was replaced with the dispersion of the resin particles 1 or the dispersion of the resin particles 4 and the amount of water was adjusted in such a manner that the resin particle content was 5.0%. These inks were applied to water-resistant paper (trade name "Water Resistant Poster Synthetic Paper (Matte)", available from CANON KABUSHIKI KAISHA) by screen printing according to the description in Example 15 of the same document. The luminescence intensity of each of the resulting printed materials was measured with a fluorescence spectrophotometer (trade name "FP-750", available from JASCO Corporation) and found to be sufficient.

Example C: Immunofluorescence Analytical Reagent

An aqueous immunofluorescence analytical reagent was prepared with reference to the description in Japanese Patent Laid-Open No. 2000-345052. Specifically, the reagent was prepared by replacing a complex and fine polymer particles described in Example 9 with the dispersion of the resin particles 1 or the dispersion of the resin particles 4. Evaluations were performed with the prepared reagents according to the description in Example 10 (sandwich assay) of the same document. The results indicated that luminescence intensity sufficient for detection was observed and luminescence intensity in accordance with the concentration of an antigen was observed.

As described above, the evaluation results of Example A indicated that in the liquid composition according to the present invention, a decrease in luminescence intensity was suppressed even after the liquid composition was stored and sufficient light resistance was exhibited. From the evaluation results of Examples A, B and C, it is understood that the liquid composition according to the present invention can be used in applications, such as in the field of reagents, other than the field of printing, as well as the field of printing.

The present invention is not limited to the above-described embodiments and various changes and modifications can be made within the spirit and scope of the present invention. Therefore, to apprise the public of the scope of the present invention, the following claims are made.

According to the present invention, it is possible to provide an aqueous liquid composition in which a decrease in luminescence intensity is suppressed even after the liquid composition is stored. According to another embodiment of the present invention, it is possible to provide an aqueous ink that can record an image in which a decrease in luminescence intensity is suppressed even after the ink is stored.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

Industrial Applicability

The invention claimed is:

1. A liquid composition that is an aqueous liquid composition that emits light when irradiated with ultraviolet light, comprising a resin particle, the resin particle containing a unit that has a polar group and containing a complex composed of a sulfur-bridged calixarene and a lanthanoid ion, the polar group being at least one selected from the group consisting of an ester group, a carboxy group, a hydroxy group, an ether group, an amino group, an amide group and a cyano group, the complex has a structure represented by Formula (1):

$$(Ln^{3+})_a\text{-}(L_1)_b \quad (1)$$

where in Formula (1), each Ln is independently Sm, Eu, Tb or Dy, each $L_1$ is independently a sulfur-bridged calixarene, a is an integer of 1 or more to 4 or less and b is an integer of 1 or 2, and in Formula (1), each $L_1$ independently has a structure according to any one of A1-A4, A12, A14, and A16:

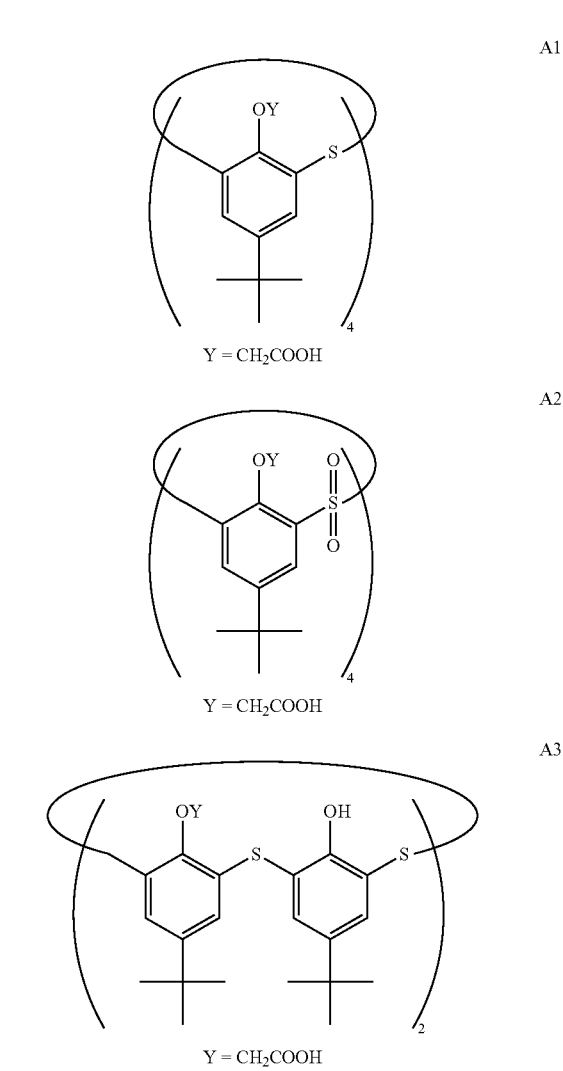

-continued

A4
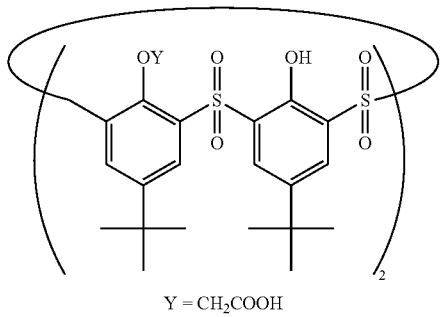
Y = CH₂COOH

A12
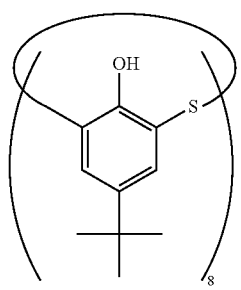

A14
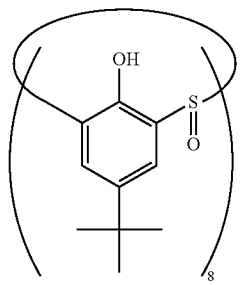

A16
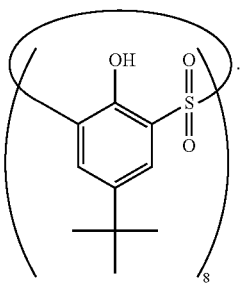

2. The liquid composition according to claim 1, wherein in formula (1), each Ln is Eu, a is 4, and b is 24.

3. The liquid composition according to claim 1, wherein in formula (1), each Ln is Tb and a is 2.

4. The liquid composition according to claim 1, wherein the polar group is at least one member selected from the group consisting of a carboxy group, a hydroxy group, an ether group, an amino group, an amide group and a cyano group.

5. The liquid composition according to claim 1, wherein in formula (1), each L₁ independently has a structure according to any one of A12, A14, and A16.

6. The liquid composition according to claim 1, wherein the resin particle is formed of an acrylic resin.

7. The liquid composition according to claim 1, wherein the liquid composition has a content of the complex of 0.001% by mass or more to 1.0% by mass or less.

8. The liquid composition according to claim 1, wherein the liquid composition has a content of the complex of 0.01% by mass or more to 0.5% by mass or less.

9. The liquid composition according to claim 1, wherein the resin particle has a content of the complex of 0.01% by mass or more to 90.00% by mass or less.

10. The liquid composition according to claim 1, wherein the resin particle has a content of the complex of 0.10% by mass or more to 50.00% by mass or less.

11. The liquid composition according to claim 1, wherein the liquid composition has a resin particle content of 1.0% by mass or more to 30.0% by mass or less.

12. The liquid composition according to claim 1, wherein the percentage of the unit having a polar group in each of the resin particles is 5.0% by mass or more to 100.0% by mass or less based on the total mass of the resin particle.

13. The liquid composition according to claim 1, wherein the percentage of the unit having a polar group in each of the resin particles is 10.0% by mass or more to 100.0% by mass or less based on the total mass of the resin particle.

14. The liquid composition according to claim 1, wherein a colorant exhibiting a color is not contained in the liquid composition.

15. The liquid composition according to claim 1, wherein in formula (1), each L1 independently has a structure according to any one of A1 to A4.

16. The liquid composition according to claim 15, wherein the resin particle has a content of the complex of 0.01% by mass or more to 10.00% by mass or less.

17. An aqueous ink that emits light when irradiated with ultraviolet light, comprising a resin particle, the resin particle containing a unit that has a polar group and containing a complex composed of a sulfur-bridged calixarene and a lanthanoid ion, the polar group being at least one selected from the group consisting of an ester group, a carboxy group, a hydroxy group, an ether group, an amino group, an amide group and a cyano group, the complex has a structure represented by Formula (1):

$$(Ln^{3+})_a\text{-}(L_1)_b \qquad (1)$$

where in Formula (1), each Ln is independently Sm, Eu, Tb or Dy, each $L_1$ is independently a sulfur-bridged calixarene, a is an integer of 1 or more to 4 or less and b is an integer of 1 or 2, and in Formula (1), each $L_1$ independently has a structure according to any one of A1-A4, A12, A14, and A16:

A1
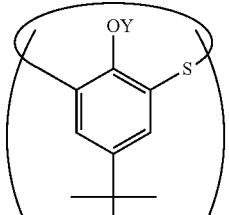
Y = CH₂COOH

-continued
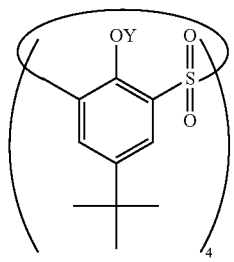
Y = CH₂COOH
A2
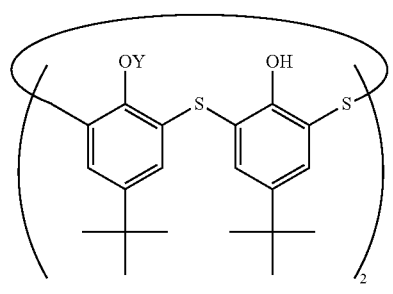
Y = CH₂COOH
A3
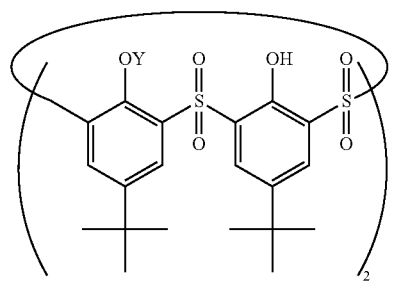
Y = CH₂COOH
A4
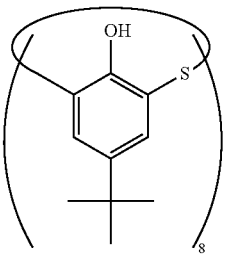
A12
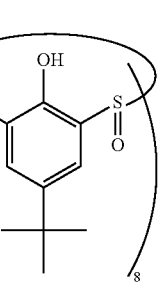
A14
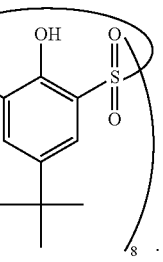
A16
\* \* \* \* \*